United States Patent
Ando et al.

(10) Patent No.: US 10,864,628 B2
(45) Date of Patent: Dec. 15, 2020

(54) ROBOT SYSTEM, ROBOT CONTROLLER, AND METHOD FOR PRODUCING TO-BE-WORKED MATERIAL

(71) Applicant: KABUSHIKI KAISHA YASKAWA DENKI, Kitakyushu (JP)

(72) Inventors: Shingo Ando, Kitakyushu (JP); Hiroshi Kumagai, Kitakyushu (JP); Takeshi Yokoyama, Kitakyushu (JP)

(73) Assignee: KABUSHIKI KAISHA YASHAWA DENKI, Kitakyushu (JP)

( * ) Notice: Subject to any disclaimer, the term of this patent is extended or adjusted under 35 U.S.C. 154(b) by 158 days.

(21) Appl. No.: 16/100,209

(22) Filed: Aug. 10, 2018

(65) Prior Publication Data

US 2019/0077010 A1 Mar. 14, 2019

(30) Foreign Application Priority Data

Sep. 8, 2017 (JP) ................. 2017-173507

(51) Int. Cl.
*G06F 7/00* (2006.01)
*B25J 9/00* (2006.01)
(Continued)

(52) U.S. Cl.
CPC ........... *B25J 9/0093* (2013.01); *B25J 9/1664* (2013.01); *B25J 9/1697* (2013.01); *B65G 47/52* (2013.01);
(Continued)

(58) Field of Classification Search
CPC ...... B25J 9/0093; B25J 9/1697; B25J 9/1664; B25J 9/12; B25J 9/1612; B25J 18/00;
(Continued)

(56) References Cited

U.S. PATENT DOCUMENTS

| 5,521,830 A * | 5/1996 | Saito ...................... B23Q 7/007 700/192 |
| 2007/0073439 A1 * | 3/2007 | Habibi ............... G05B 19/4182 700/213 |

(Continued)

FOREIGN PATENT DOCUMENTS

| EP | 2335885 | 6/2011 |
| JP | S60-221230 A | 11/1985 |

(Continued)

OTHER PUBLICATIONS

Japanese Office Action for corresponding JP Application No. 2017-173507, dated Jun. 25, 2019 (w/ machine translation).

(Continued)

*Primary Examiner* — Yolanda R Cumbess
(74) *Attorney, Agent, or Firm* — Mori & Ward, LLP

(57) ABSTRACT

A robot system includes a conveyor, a robot, a speed calculation circuit, and a robot control circuit. The conveyor is configured to convey a workpiece at a conveyance speed. The robot is configured to work on the workpiece while the workpiece is conveyed by the conveyor. The speed calculation circuit is configured to calculate the conveyance speed. The robot control circuit is configured to control a working speed of the robot according to the conveyance speed calculated by the speed calculation circuit.

4 Claims, 7 Drawing Sheets

(51) Int. Cl.
  *B65G 47/52* (2006.01)
  *B25J 9/16* (2006.01)
  *G05B 19/418* (2006.01)

(52) U.S. Cl.
  CPC .............. *G05B 19/4182* (2013.01); *G05B 2219/37189* (2013.01); *G05B 2219/39102* (2013.01)

(58) Field of Classification Search
  CPC ...... G05B 19/4182; G05B 2219/37189; G05B 2219/39102; B65G 47/52; Y02P 90/02
  USPC .................................................. 700/230, 229
  See application file for complete search history.

(56) References Cited

U.S. PATENT DOCUMENTS

| | | | |
|---|---|---|---|
| 2011/0087360 A1* | 4/2011 | Chen ....................... | B25J 9/1697 700/114 |
| 2016/0136813 A1 | 5/2016 | Hiro et al. | |
| 2016/0151916 A1 | 6/2016 | Kanno et al. | |
| 2018/0029233 A1* | 2/2018 | Lager ..................... | B25J 9/1676 |
| 2018/0043527 A1* | 2/2018 | Koga ..................... | B25J 9/0093 |
| 2018/0257238 A1* | 9/2018 | Hashimoto ............ | B25J 13/003 |
| 2018/0333849 A1* | 11/2018 | Sugio ..................... | B25J 9/1664 |
| 2019/0015973 A1* | 1/2019 | Ooba ..................... | B65G 47/52 |

FOREIGN PATENT DOCUMENTS

| | | |
|---|---|---|
| JP | H09-085657 A | 3/1997 |
| JP | 2004-001122 A | 1/2004 |
| JP | 2015-003371 A | 1/2015 |
| JP | 2016-107349 A | 6/2016 |
| JP | 6172334 B2 | 2/2017 |

OTHER PUBLICATIONS

Park et al., "Two-Stage Control Approach of a Robot Manipulator for Conveyor Tracking Application", Industrial Electronics, Control and Instrumentation, Sep. 5, 1994, pp. 691-696, vol. 2, XP010137543.

Tho et al., "Design and Development of the Vision Sorting System", 2016 3rd International Conference on Green Technology and Sustainable Development (GTSD), IEEE, Nov. 24, 2016, pp. 217-223, XP033029483.

Extended European Search Report for corresponding EP Application No. 18192522.3-1205, dated Jan. 30, 2019.

Japanese Office Action for corresponding JP Application No. 2017-173507, dated Oct. 6, 2020 (w/ English machine translation).

Japanese Office Action for corresponding JP Application No. 2017-173507, dated May 26, 2020 (w/ machine translation).

\* cited by examiner

ROBOT SYSTEM, ROBOT CONTROLLER, AND METHOD FOR PRODUCING TO-BE-WORKED MATERIAL

CROSS-REFERENCE TO RELATED APPLICATIONS

The present application claims priority under 35 U.S.C. § 119 to Japanese Patent Application No. 2017-173507, filed Sep. 8, 2017. The contents of this application are incorporated herein by reference in their entirety.

BACKGROUND

Field of the Invention

The embodiments disclosed herein relate to a robot system, a robot controller, and a method for producing a to-be-worked material.

Discussion of the Background

As conventionally known, some robots have a plurality of joints and move by driving the plurality of joints. At the leading end of such robot, an end effector is mounted. The end effector varies depending on the application in which the end effector is used, such as screwing and holding, enabling the robot to perform various kinds of work such as machining and moving of workpieces.

JP 6172334B discloses a robot system that includes a conveyor and the foregoing kind of robot. The conveyor conveys a workpiece, and the robot works on the workpiece while the workpiece is being conveyed on the workpiece.

SUMMARY

According to one aspect of the present disclosure, a robot system includes a conveyor, a robot, a speed calculation circuit, and a robot control circuit. The conveyor is configured to convey a workpiece at a conveyance speed. The robot is configured to work on the workpiece while the workpiece is conveyed by the conveyor. The speed calculation circuit is configured to calculate the conveyance speed. The robot control circuit is configured to control a working speed of the robot according to the conveyance speed calculated by the speed calculation circuit.

According to another aspect of the present disclosure, a robot controller includes a speed calculation circuit and a robot control circuit. The speed calculation circuit is configured to calculate a conveyance speed at which a workpiece is conveyed by a conveyor. The robot control circuit is configured to control a working speed of a robot according to the conveyance speed calculated by the speed calculation circuit. The robot is configured to work on the workpiece while the workpiece is conveyed by the conveyor.

According to the other aspect of the present disclosure, a method for producing a to-be-worked material includes calculating a conveyance speed at which a workpiece is conveyed by a conveyor. A working speed of a robot is controlled according to the conveyance speed. The robot is configured to work on the workpiece while the workpiece is conveyed by the conveyor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

By referring to the accompanying drawings, a robot system, a robot controller, and a method for producing a to-be-worked material according to an embodiment and modifications will be described in detail below. It is noted that the following embodiment and modifications are provided for exemplary purposes only and are not intended in a limiting sense. In the following description, the term "to-be-worked material" will be referred to as "workpiece". While in the following description the robot performs screwing on workpieces, screwing is not intended as limiting the type of operation to be performed. Other examples of operation include, but are not limited to, coating and welding.

In the following description, the "leading end of the robot" not only literally means the leading end of the robot but also encompasses the leading end of an end effector mounted on the robot and the leading end of an object held by the end effector.

In the following description, terms such as "orthogonal", "perpendicular", "parallel", "vertical", and "horizontal" may not necessarily be used in a strict sense. That is, these terms may be used with production-related and installation-related tolerances and errors taken into consideration.

Figure 1:
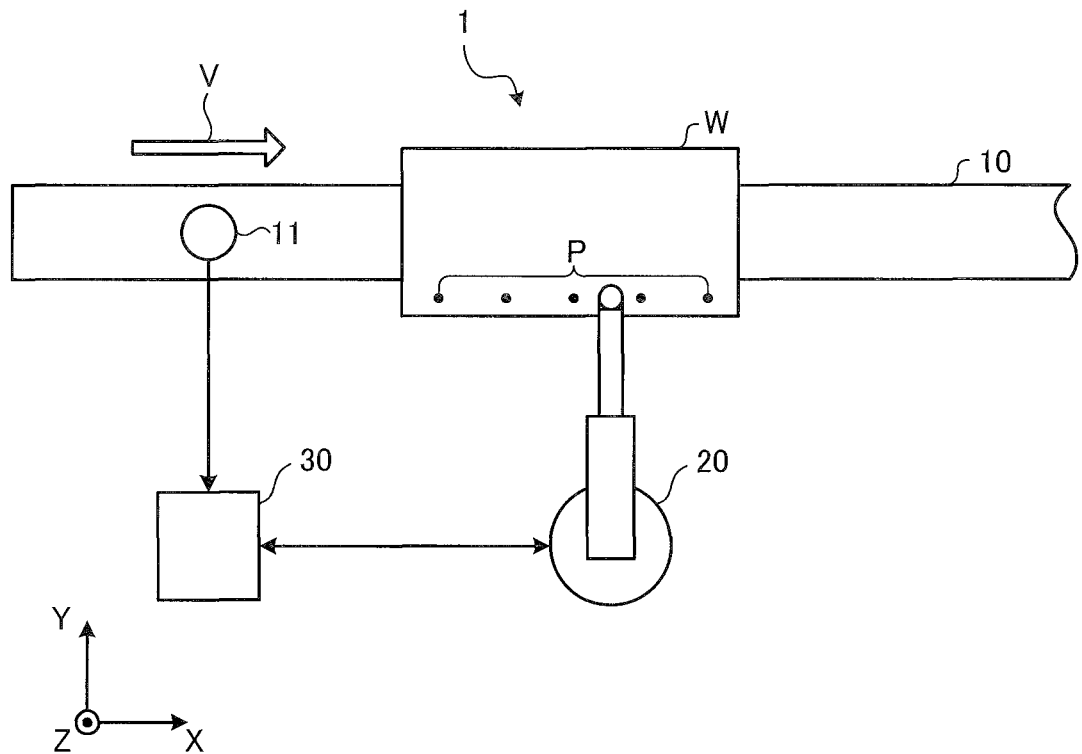
FIG. 1 is a schematic illustrating a robot system according to an embodiment.

A robot system 1 according to this embodiment will be described by referring to FIG. 1. FIG. 1 is a schematic illustrating the robot system 1 according to this embodiment. In the schematic illustrated in FIG. 1, the robot system 1 is viewed from above. For ease of description, FIG. 1 also illustrates a three-dimensional orthogonal coordinate system, with X, Y, Z axes. The positive direction of the Z axis is its vertically upward direction, and the positive direction of the X axis is the conveyance direction in which a workpiece W is conveyed. This orthogonal coordinate system may also be illustrated in some other drawings referred to in the following description.

As illustrated in FIG. 1, the robot system 1 includes a conveyor 10, a camera 11, a robot 20, and a robot controller 30. A non-limiting example of the conveyor 10 is a belt conveyor that conveys the workpiece W placed on a belt. A non-limiting example of the camera 11 is a video camera that is located above the conveyor 10 and that continuously picks up an image of the workpiece W being conveyed. Based on the image picked up by the camera 11, the camera 11 calculates, at any desired timing, the conveyance speed, V, of the workpiece W. The camera 11 corresponds to an obtainer 11, which obtains conveyance speed.

The robot 20 performs a predetermined operation on a plurality of predetermined worked portions P of the workpiece W. A non-limiting example of the predetermined operation is screwing, which fastens a screw in a screw hole. It will be understood by those skilled in the art that in order for the robot 20 to perform screwing on the worked portions P of the workpiece W, which is moved at the conveyance speed V, the robot 20 needs to follow the movement of the workpiece W, and the worked portions P. This kind of operation, that is, an operation that involves following the movement of the workpiece W, will be hereinafter referred to as "first operation". An exemplary configuration of the robot 20 will be described later by referring to FIG. 3.

The robot controller 30 controls the motion of the robot 20. Specifically, the robot controller 30 corrects the motion speed of the robot 20 based on the conveyance speed V calculated by the camera 11. This ensures a high level of accuracy for the robot 20 in following the workpiece W being conveyed, even if the conveyance speed V of the workpiece W is deviated from a predetermined speed and/or if the conveyance speed V is caused to vary due to a pulsation or similar occurrences. This ensures that a high level of operation accuracy is maintained.

Thus, an operation is not performed on the workpiece W with the workpiece W kept stationary. Instead, an operation is performed on the workpiece W while the workpiece W is being conveyed, with the motion speed of the robot 20 being adjusted based on the conveyance speed V of the workpiece W. This eliminates or minimizes loss of time otherwise caused when the workpiece W is turned into stationary state. This, in turn, reduces the total operation time associated with working on the workpiece W.

It is while the workpiece W is kept stationary that the robot controller 30 generates in advance teaching data by teaching the robot 20 a motion and changes the reproduction speed of the teaching data based on the conveyance speed V. This configuration will be described later by referring to FIGS. 4 to 6. Also, the robot system 1 may include a plurality of robots 20, which will be described later by referring to FIG. 7.

While in FIG. 1 the conveyance speed V of the workpiece W is calculated using the camera 11, the conveyance speed V may be calculated based on an output from an encoder of an actuator such as a motor of the conveyor 10. Alternatively, instead of using the camera 11 to calculate the conveyance speed V, it is possible to cause the robot controller 30 to obtain a picked-up image from the camera 11 and calculate the conveyance speed V based on the obtained picked-up image.

Figure 2:
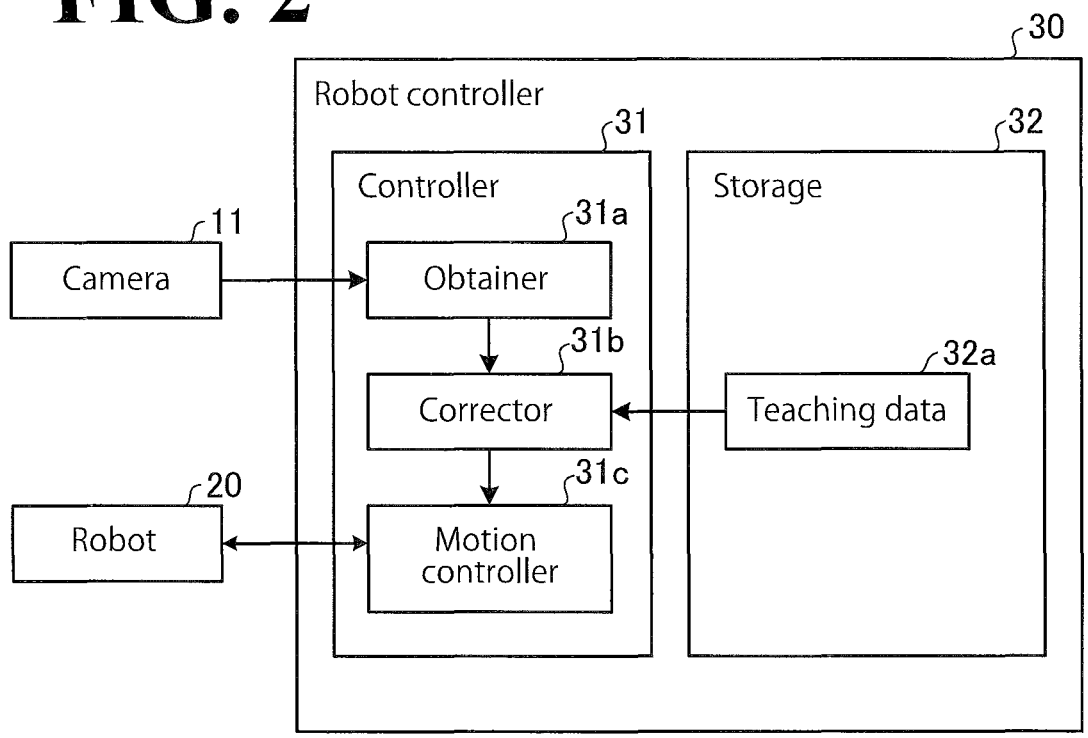
FIG. 2 is a block diagram of a robot controller.

A configuration of the robot controller 30 will be described by referring to FIG. 2. FIG. 2 is a block diagram of the robot controller 30. As illustrated in FIG. 2, the robot controller 30 is connected to the camera 11 and the robot 20. The robot controller 30 includes a controller 31 and a storage 32.

The controller 31 includes an obtainer 31a, a corrector 31b, and a motion controller 31c. The storage 32 stores teaching data 32a. While in FIG. 1 a single robot controller 30 is illustrated for simplicity of description, it is also possible to use a plurality of robot controllers 30 each corresponding to one of a plurality of robots 20. In this case, it is possible to provide an upper-level controller that controls over the plurality of robot controllers 30.

The robot controller 30 includes a computer and various circuits. The computer includes a central processing unit (CPU), a read only memory (ROM), a random access memory (RAM), a hard disk drive (HDD), and input-output ports.

The CPU of the computer reads programs stored in the ROM and executes the programs, and thus functions as the obtainer 31a, the corrector 31b, and the motion controller 31c of the controller 31.

Also, at least one or all of the obtainer 31a, the corrector 31b, and the motion controller 31c may be implemented by hardware such as ASIC (Application Specific Integrated Circuit) and FPGA (Field Programmable Gate Array).

The storage 32 corresponds to the RAM and/or the HDD. The RAM and the HDD are capable of storing the teaching data 32a. It will be understood by those skilled in the art that the robot controller 30 may obtain the above-described programs and the various kinds of information from another computer connected to the robot controller 30 through a wired or wireless network or from a portable recording medium. As described above, it is possible to provide a plurality of robot controllers 30 communicable with each other. In this case, the plurality of robot controllers 30 may be implemented in a hierarchical configuration in which each robot controller 30 is communicable with an upper-level or lower-level robot controller 30.

The controller 31 controls the motion of the robot 20. When a plurality of robot controllers 30 are provided, the controller 31 may also perform processing of synchronizing the robot controllers 30.

The obtainer 31a continuously obtains the conveyance speed V of the workpiece W (see FIG. 1). Then, the obtainer 31a outputs the obtained conveyance speed V to the corrector 31b. While in FIG. 2 the conveyance speed V is obtained from the camera 11, which is an external device, the obtainer 31a may calculate the conveyance speed V based on image data received from the camera 11.

Based on the conveyance speed V received from the obtainer 31a, the corrector 31b corrects the motion speed of the robot 20, which moves based on the teaching data 32a. The teaching data 32a is information that is prepared in the teaching stage, in which the robot 20 is taught a motion, and that contains "jobs" constituting a program defining a motion path for the robot 20.

The corrector 31b corrects the motion speed of the robot 20 by, for example, changing the reproduction speed of the teaching data 32a. Details of generation of the teaching data 32a and details of the reproduction speed of the teaching data 32a will be described later by referring to FIGS. 4 to 6. The corrector 31b also performs, based on the conveyance speed V, processing of calculating the position of the workpiece W being conveyed.

The motion controller 31c causes the robot 20 to move based on teaching data 32a that has undergone reproduction speed adjustment performed by the corrector 31b. The motion controller 31c improves motion accuracy of the robot 20 by, for example, performing feedback control using a value from an encoder of an actuator such as the motor of the robot 20, which is the motive power source of the robot 20.

Figure 3:
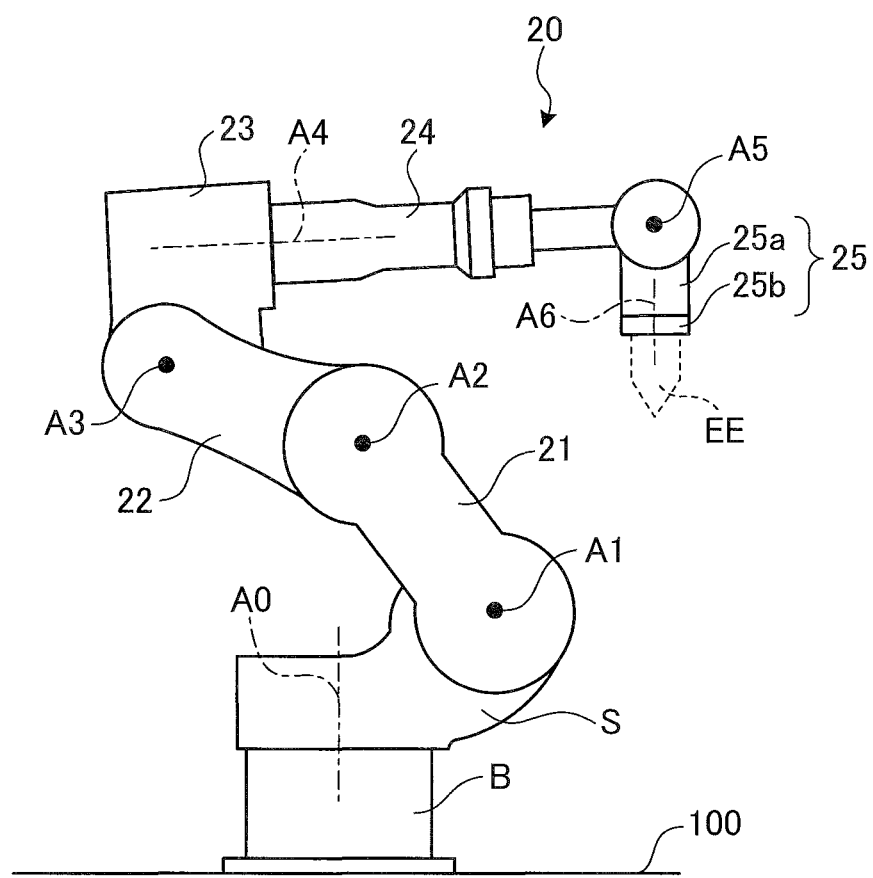
FIG. 3 is a side view of a robot.

An exemplary configuration of the robot 20 will be described by referring to FIG. 3. FIG. 3 is a side view of the robot 20. As illustrated in FIG. 3, the robot 20 is a "vertical multi-articular robot" having seven axes, namely, vertical axis A0 to sixth axis A6. The robot 20 includes (in increasing order of distance from the base end) a base B, a turnable portion S, a first arm 21, a second arm 22, a third arm 23, a fourth arm 24, and a wrist 25.

The base B is fixed to a ground plane 100, such as a floor. The turnable portion S is supported by the base B and is turnable about the vertical axis A0, which is perpendicular to the ground plane 100. The first arm 21, at is base end, is supported by the turnable portion S and is turnable about first axis A1, which is perpendicular to the vertical axis A0. The second arm 22, at is base end, is supported by the leading end of the first arm 21 and is turnable about second axis A2, which is parallel to the first axis A1.

The third arm 23, at is base end, is supported by the leading end of the second arm 22 and is turnable about third axis A3, which is parallel to the second axis A2. The fourth arm 24, at is base end, is supported by the leading end of the third arm 23 and is rotatable about fourth axis A4, which is perpendicular to the third axis A3. The wrist 25 includes a base end 25a and a leading end 25b. The base end 25a, at is base end, is supported by the leading end of the fourth arm 24 and is turnable about fifth axis A5, which is orthogonal to the fourth axis A4.

The leading end 25b, at is base end, is supported by the leading end of the base end 25a and is turnable about sixth axis A6, which is orthogonal to the fifth axis A5. At the leading end of the leading end 25b, a replaceable end effector EE is mounted. In this embodiment, the end effector EE is a screw device. Other examples of the end effector EE include, but are not limited to, a sealing device, a coating device, a spot welder, and an arc welder.

It will be understood by those skilled in the art that the third arm 23, the fourth arm 24, and the wrist 25 each may have a hollow structure. A hollow structure allows cables and wires for the end effector EE to pass through the hollow structure. This eliminates the need for routing cables and wires along the exterior of the robot 20, enlarging the movable range of the robot 20.

Figure 4:
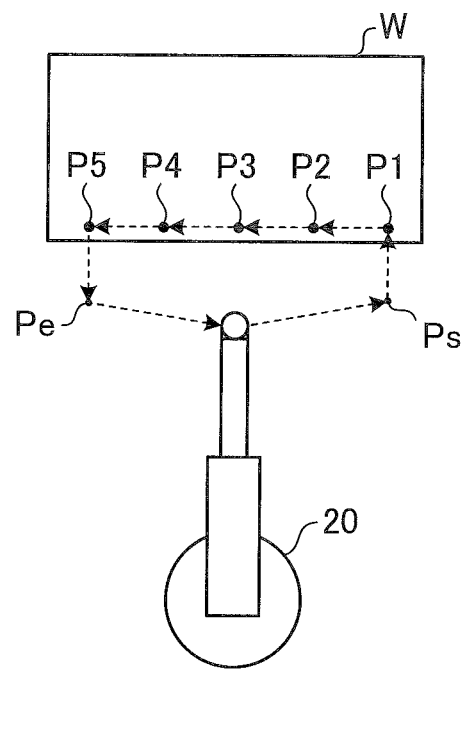
FIG. 4 illustrates a teaching operation performed with a workpiece kept stationary.

By referring to FIG. 4, processing of generating the teaching data 32a illustrated in FIG. 2 will be described. FIG. 4 illustrates a teaching operation performed with the workpiece W kept stationary. While in FIG. 4 five worked portions P (worked portions P1 to P5) are provided on the workpiece W, any other number of worked portions P may be provided as desired. Referring to FIG. 4, a preparation position Ps is a pre-operation preparation position, and a preparation position Pe is a post-operation preparation position. It is possible, however, to omit these preparation positions.

As illustrated in FIG. 4, the teaching data 32a (see FIG. 2) is generated by teaching the robot 20 a motion path with the workpiece W kept stationary. Specifically, the robot 20 is taught to make such a motion that, starting from the original posture illustrated in FIG. 4, the robot 20 moves the leading end of the end effector EE (see FIG. 3) to the preparation position Ps, the worked portion P1, the worked portion P2, the worked portion P3, the worked portion P4, the worked portion P5, and the preparation position Pe, and finally returns to the original posture.

In performing screwing or any other "first operation" on the worked portions P1 to P5, the robot 20 needs to stay at each worked portion P for a predetermined period of time (for example, a period of time necessary between start and completion of screwing). In light of this, the teaching data 32a includes periods of time for which the robot 20 stays at the worked portions P1 to P5.

Also in the teaching data 32a, a period of time "Ts" is recorded. The period of time Ts is taken by the robot 20 to make the above-described motion: start from the original posture illustrated in FIG. 4; move the leading end of the end effector EE to the preparation position Ps, the worked portion P1, the worked portion P2, the worked portion P3, the worked portion P4, the worked portion P5, and the preparation position Pe; and finally return to the original posture. The period of time (Ts) is used in the correction processing, which will be described later by referring to FIG. 5.

It will be understood by those skilled in the art that the teaching data 32a may be generated by the controller 31 of the robot controller 30 illustrated in FIG. 2 or may be generated by an external device and stored in the storage 32.

Also, while in FIG. 4 a single robot 20 is provided, two robots 20 may be provided, for example. In this case, the robots 20 may be taught respective motions with one workpiece W kept stationary at a position suitable for the one workpiece W to be worked on by one robot 20 and with another workpiece W kept stationary at another position suitable for the another workpiece W to be worked on by the other robot 20.

Figure 5:
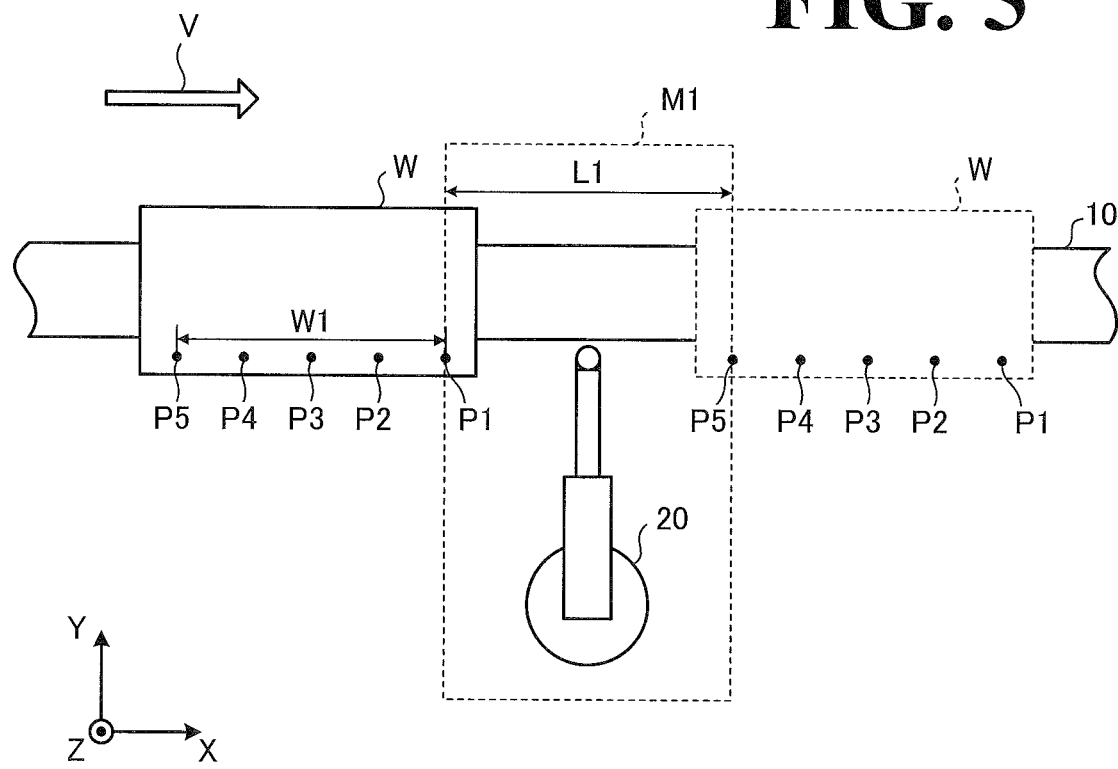
FIG. 5 illustrates an operation performed on a moving workpiece.

Before the correction processing performed by the corrector 31b illustrated in FIG. 2 is described, description will be made, by referring to FIG. 5, with regard to an operation that the robot 20 performs on the workpiece W while workpiece W is being moved. FIG. 5 illustrates an operation performed on a moving workpiece W. In FIG. 5 and the drawings that follow, the preparation position Ps and the preparation position Pe illustrated in FIG. 4 are omitted.

As illustrated in FIG. 5, an operation specified for the robot 20 is performed within a movable range M1. The movable range M1 extends over a width of L1 in the conveyance direction. When the worked portion P1, which is the first worked portion, has reached the movable range M1, the robot 20 starts the operation on the worked portion P1. In FIG. 5, the workpiece W reaching the position at which the operation starts (operation start position) is indicated by solid lines.

Then, the robot 20 performs the operation on the worked portions P2 to P5 and completes the operation on the worked portion P5, which is the last worked portion, immediately before the worked portion P5 is out of the movable range M1. In FIG. 5, the workpiece W reaching the position at which the operation ends (operation end position) is indicated by broken lines.

Assume that Tm denotes the maximum period of time between the time when the robot 20 starts the operation on the workpiece W within the movable range M1 and the time when the robot 20 finishes the operation, and that the distance between the first worked portion P1 and the last worked portion P5 of the workpiece W is W1. In this case, Tm is represented by the equation "Tm=(W1+L1)/V".

Thus, a period of time "Tm" is spent before completing the operation on the workpiece W within the movable range M1 while the workpiece W is being conveyed at the conveyance speed V, and a period of time "Ts" is spent before completing the operation on the workpiece W in stationary state, as described above.

This leads to the equation "k=Tm/Ts", and the equation can be used to multiply (by k times) the reproduction speed of the teaching data 32a, which is generated while the workpiece W is kept stationary. This enables the robot 20 to complete the operation on the workpiece W within the movable range M1 while the workpiece W is being conveyed at the conveyance speed V. In this manner, the corrector 31b illustrated in FIG. 2 determines the reproduction speed of the teaching data 32a. In the following description, "k" may occasionally be referred to as "override ratio".

Then, the corrector 31b (see FIG. 2) continuously receives the conveyance speed V of the workpiece W, and changes the reproduction speed of the teaching data 32a according to a change in the conveyance speed V. This ensures that even if a change occurs in the conveyance speed V, the robot 20 is able to complete the operation on the workpiece W within the movable range M1.

Figure 6:
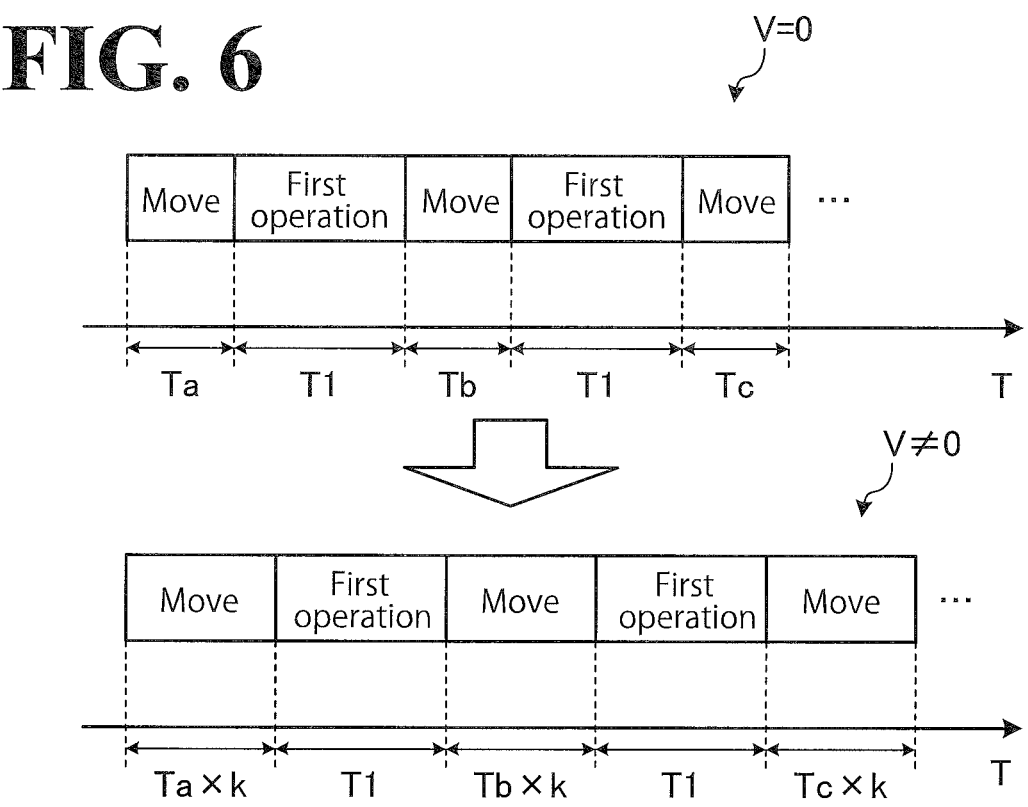
FIG. 6 illustrates details of correction processing.

The correction processing performed by the corrector 31b illustrated in FIG. 2 will be described in more detail by referring to FIG. 6. FIG. 6 illustrates details of the correction processing. FIG. 6 illustrates correction processing performed at a conveyance speed V of zero (that is, while the workpiece W is in stationary state), and correction processing performed at a conveyance speed V of other than zero (that is, while the workpiece W is being moved).

Assume that T1 denotes the period of time necessary for the first operation to be performed on each of the worked portions with the workpiece W kept stationary, and Ta, Tb, and Tc each denote the period of time necessary for movement between one worked portion and another worked portion. While the workpiece W is being moved, the corrector 31b (see FIG. 2) reproduces the teaching data 32a so that the movement periods of time are k times (k=Tm/Ts) the movement periods of time in the case where the workpiece W is kept stationary.

In reproducing the teaching data 32a, however, the corrector 31b leaves T1 (the period of time for the first operation to be performed) unmultiplied by k. This is because in the first operation, it is necessary for the robot 20 to stay at each of the worked portions for a predetermined period of time, irrespective of whether the workpiece W is stationary or moving. This enables the robot 20 to complete the first operation on the workpiece W within the movable range M1 illustrated in FIG. 5 while maintaining a high level of accuracy of the first operation.

In this embodiment, the first operation is to cause the robot 20 to stay at predetermined portions of the workpiece W each for a predetermined period of time. This configuration, however, is not intended in a limiting sense. The first operation may be to make relative speed of the robot 20 relative to the workpiece W constant for a predetermined period of time. Examples of applications in which this operation can be used include, but are not limited to: arc welding in which welding proceeds linearly on the workpiece W; and sealing that ejects sealant linearly onto the workpiece W.

Figure 7:
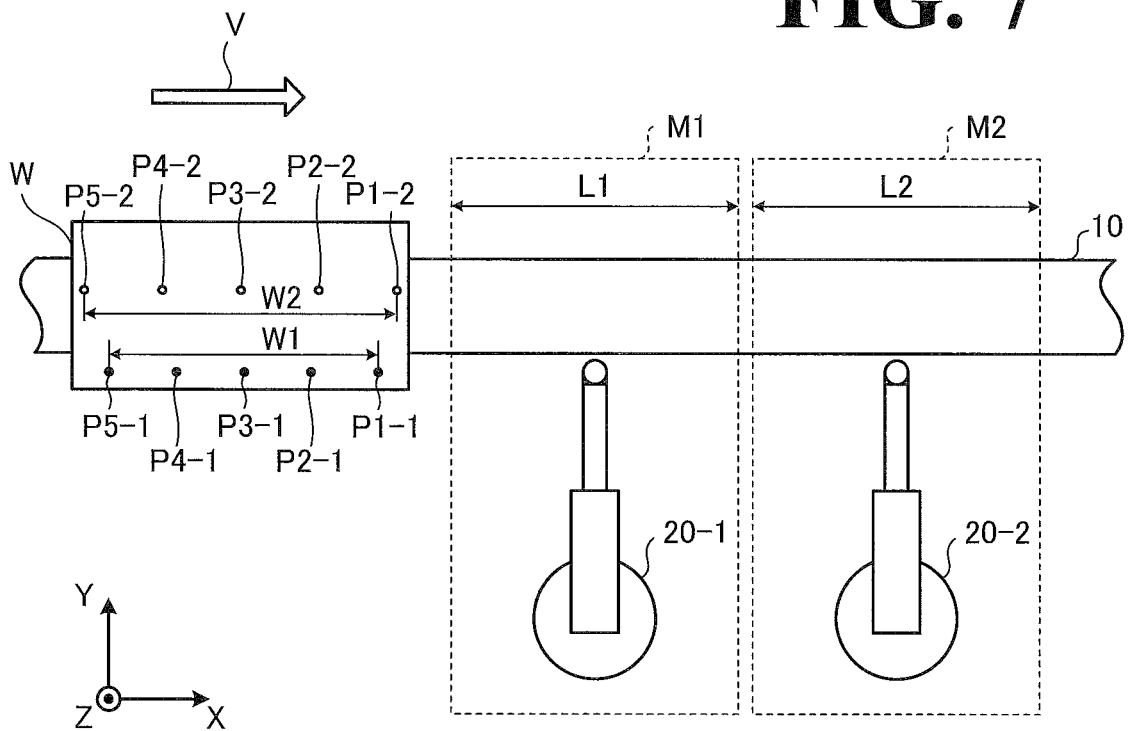
FIG. 7 illustrates a configuration in which a plurality of robots are arranged.

By referring to FIG. 7, description will be made with regard to a configuration in which a plurality of robots 20 are arranged in the conveyance direction. FIG. 7 illustrates a configuration in which a plurality of robots 20 are arranged. As illustrated in FIG. 7, the plurality of robots 20 are arranged in the conveyance direction so that the plurality of robots 20 share an operation on the workpiece W. This improves workability on the workpiece W being conveyed. While in FIG. 7 two robots 20 are arranged in the conveyance direction, any other number of robots 20 may be provided.

Also in FIG. 7, each of the plurality of robots 20 is suffixed with a hyphen and a number, such as "robot 20-1" and "robot 20-2", to distinguish the plurality of robots 20 from each other. Similarly, each of the worked portions P1 to P5 of the workpiece W is suffixed with a hyphen and a number.

As illustrated in FIG. 7, the robot 20-1 and the robot 20-2 are arranged with the movable range M1 of the robot 20-1 and the movable range, M2, of the robot 20-2 not overlapping each other in the conveyance direction. While in FIG. 7 there is a gap between the movable range M1 and the movable range M2, such gap may be omitted insofar as the movable range M1 and the movable range M2 do not overlap each other in the conveyance direction. Also, while in FIG. 7 the movable range M1 and the movable range M2 are rectangular, the shapes of the movable range M1 and the movable range M2 will not be limited to rectangular shapes. Insofar as the movable range M1 and the movable range M2 do not overlap each other in the conveyance direction, the movable range M1 and the movable range M2 may have any other shapes.

The robot 20-1 moves at a motion speed that enables the robot 20-1 to complete an operation on the workpiece W within the movable range M1, and the robot 20-2 moves at a motion speed that enables the robot 20-2 to complete an operation on the workpiece W within the movable range M2. That is, the robot 20-1 and the robot 20-2 need not be interlocked with each other, eliminating or minimizing waiting time of the robot 20-1 and the robot 20-2.

This improves workability on the workpiece W being conveyed. Specifically, productivity improves in proportion to the number of robots 20. That is, in the above configuration, productivity improves in proportion to the number of robots 20 and the conveyance speed V. The above configuration also provides a greater degree of freedom of allocating the worked portions P of the workpiece W to the robots 20.

Assume that there is a distance of W1 between the first worked portion P1-1 and the last worked portion P5-1, which correspond to the robot 20-1. In this case, the above-described equation "Tm=(W1+L1)/V" represents the period of time Tm taken by the robot 20-1 to complete the operation on the workpiece W within the movable range M1.

Also assume that there is a distance of W2 between the first worked portion P1-2 and the last worked portion P5-2, which correspond to the robot 20-2. In this case, the equation "Tm=(W2+L2)/V" represents the period of time Tm taken by the robot 20-2 to complete the operation on the workpiece W within the movable range M2.

That is, assume that there are n robots 20 and there is a distance of Wn between the first worked portion P1-n and the last worked portion P5-n, which correspond to the robot 20-n, which is the n-th robot. In this case, the equation "Tm=(Wn+Ln)/V" represents the period of time Tm taken by the robot 20-n to complete the operation on the workpiece W within the movable range, Mn, of the robot 20-n.

Thus, even when there are a plurality of robots 20, the periods of time Tm taken by the robots 20 can be calculated according to a procedure similar to the procedure illustrated in FIG. 5. Then, teaching data 32a corresponding to each of the robots 20 is reproduced with the movement periods of time multiplied by k(k=Tm/Ts). This enables each of the robots 20 to maintain a high level of accuracy of the operation on the workpiece W even if the conveyance speed V of the workpiece W changes.

While in FIG. 7 the number of the worked portions corresponding to the robot 20-1 and the number of the worked portions corresponding to the robot 20-2 are the same, the number of worked portions may vary depending on the individual robot 20.

Figure 8A:
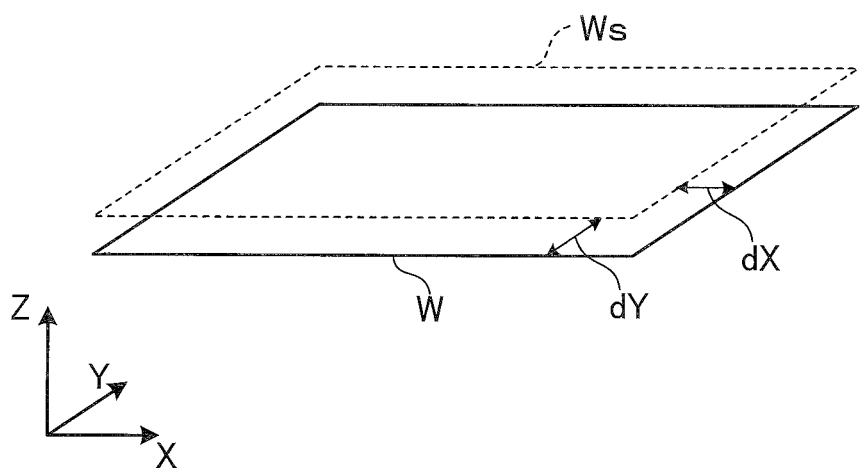
FIG. 8A illustrates a position displacement of the workpiece.

The robot system 1 is also capable of eliminating or minimizing the influence of position displacement and the influence of posture displacement of the workpiece W. This will be described below by referring to FIGS. 8A and 8B. FIG. 8A illustrates a position displacement of the workpiece W, and FIG. 8B illustrates a posture displacement of the workpiece W.

It will be understood by those skilled in the art that the camera 11 illustrated in FIG. 2 may detect a position displacement and a posture displacement of the workpiece W, or the controller 31 of the robot controller 30 may detect a position displacement and a posture displacement of the workpiece W based on image data received from the camera 11. In the latter case, the obtainer 31a illustrated in FIG. 2 may perform the detection processing, or a detector provided between the camera 11 and the corrector 31b and provided in parallel to the obtainer 31a may perform the detection processing. Alternatively, the corrector 31b may perform the detection processing.

As illustrated in FIG. 8A, the position of the workpiece W may occasionally be displaced by dX in the conveyance direction, and displaced by dY in horizontal direction, which is perpendicular to the conveyance direction. As illustrated in FIG. 8A, a workpiece Ws, which is indicated by broken lines, is displaced in position from the workpiece W located at a desired position.

Figure 8B:
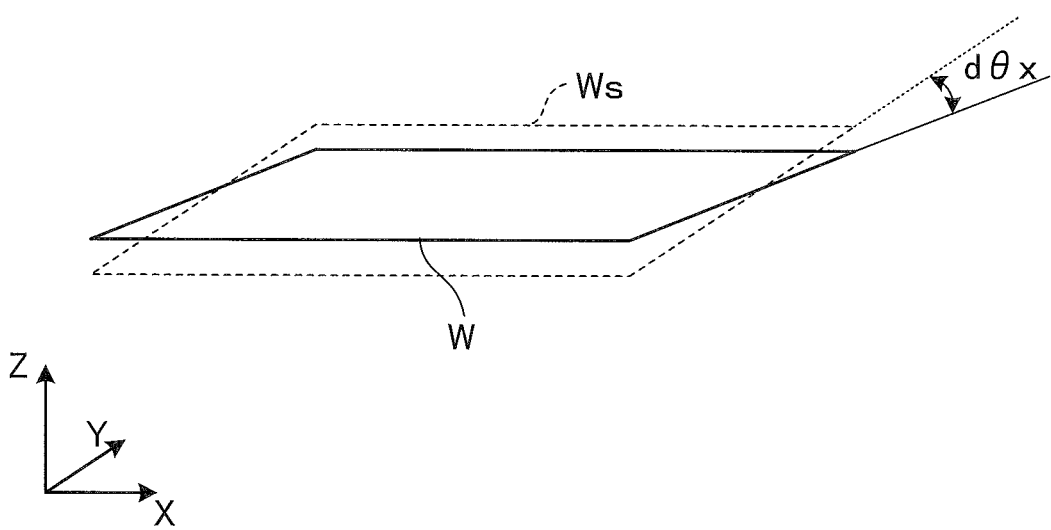
FIG. 8B illustrates a posture displacement of the workpiece.

As illustrated in FIG. 8B, the posture of the workpiece W may occasionally be displaced by dθx in the conveyance direction. As illustrated in FIG. 8B, a workpiece Ws, which is indicated by broken lines, is displaced in posture from the workpiece W having a desired posture. While in FIG. 8B the posture of the workpiece W is displaced in the conveyance direction (X axis direction), it is also possible for the posture of the workpiece W to be displaced by dθy in the Y axis direction illustrated in FIG. 8B and/or by dθz in the Z axis direction illustrated in FIG. 8B. The posture displacements in the Y and Z axis directions can be corrected, similarly to the posture displacement in the conveyance direction.

The above-described detector detects, based on image data received from the camera 11, a position displacement relative to the desired position. The above-described detector also detects, based on the image data received from the camera 11, a posture displacement relative to the desired posture. It is possible to detect a position displacement based on a mark on the conveyance surface of the conveyor 10 (see FIG. 1) on which the conveyor 10 conveys the workpiece W. Alternatively, it is possible to detect a position displacement by calculating, at any desired timing, an imaginary desired position based on the conveyance speed V and comparing the actual position with the calculated desired position.

It is possible to detect a posture displacement by comparing an outline of the desired posture of the workpiece W viewed from above with the outline of the workpiece W in the image data. In this embodiment, a position displacement and a posture displacement are detected based on an image picked up by the camera 11. In another possible embodiment, a plurality of sensors such as optical sensors may be arranged in or on the conveyor 10, and a position displacement and a posture displacement may be detected based on outputs from the sensors.

The corrector 31b illustrated in FIG. 2 corrects the teaching data 32a based on the position displacement and the posture displacement of the workpiece W detected in the above-described manner. This eliminates or minimizes the influence of the position displacement of the workpiece W and the influence of the posture displacement of the workpiece W. This, in turn, enables the robot system 1 to maintain a high level of operation accuracy irrespective of position displacement and posture displacement of the workpiece W.

Figure 9:
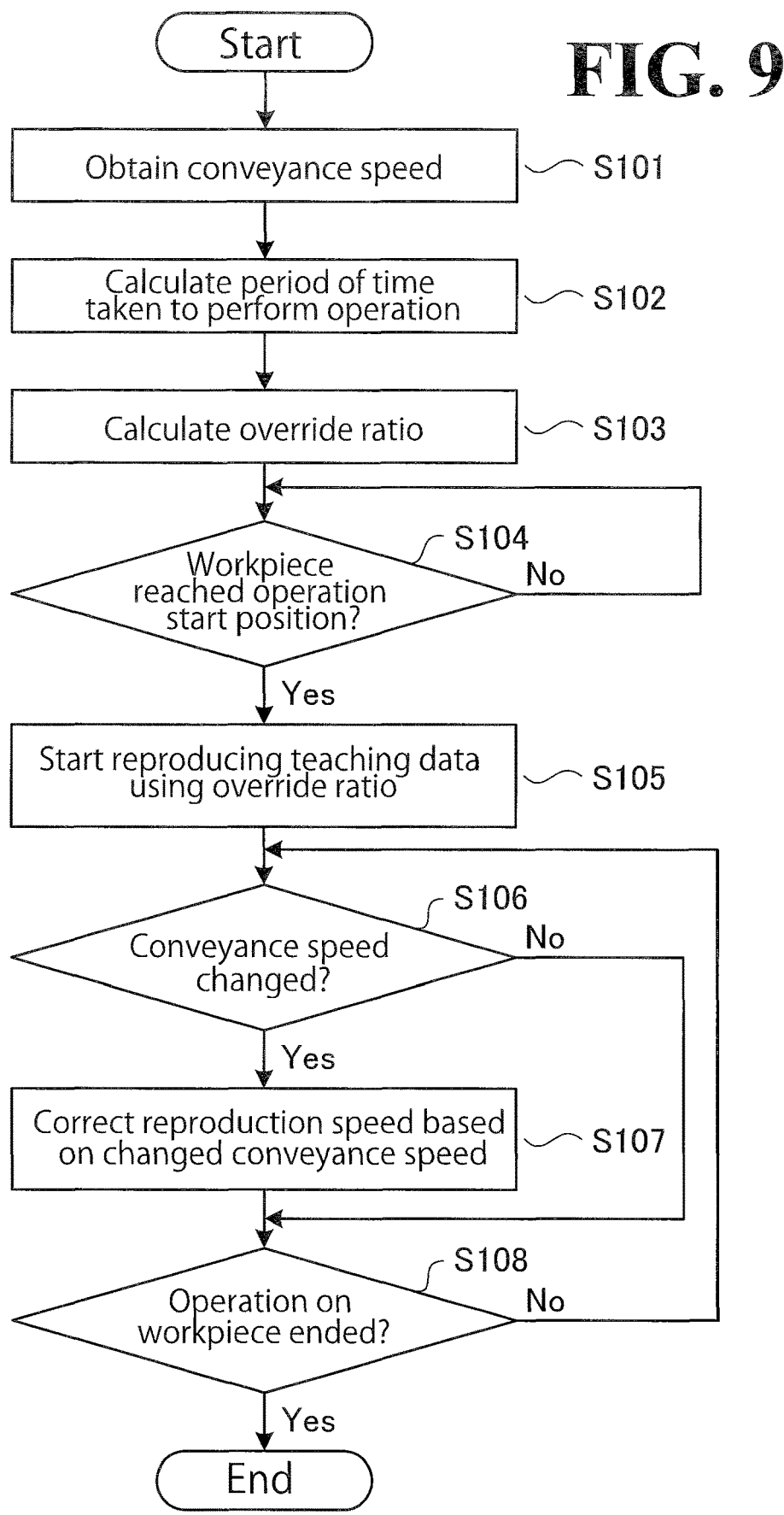
FIG. 9 is a flowchart of a procedure for processing performed by the robot controller.

A procedure for processing performed by the robot controller 30 will be described by referring to FIG. 9. The following description referring to FIG. 9 is under the assumption that there is a single robot 20, as in FIGS. 4 to 6. When there are a plurality of robots 20, the processing illustrated in FIG. 9 may be performed a plurality of times simultaneously for the robots 20.

Also, the following description referring to FIG. 9 is under the assumption that the teaching data 32a has already been generated in the stationary teaching illustrated in FIG. 4, and that Ts (which is the period of time recorded in the stationary teaching illustrated in FIG. 4) has already been calculated.

As illustrated in FIG. 9, the camera 11 obtains the conveyance speed V of the workpiece W (step S101). The corrector 31b receives the conveyance speed V through the obtainer 31a, and solves the equation "Tm=(W1+L1)/V". In this manner, the corrector 31b calculates Tm, which is the period of time taken by the robot 20 to perform an operation on the workpiece W conveyed at the conveyance speed V within the movable range M1 (step S102). The corrector 31b also calculates the override ratio k by solving the equation "k=Tm/Ts" (step S103).

Next, the corrector 31b determines whether the workpiece W has reached the operation start position (step S104). When the workpiece W has reached the operation start position (Yes at step S104), the motion controller 31c starts reproducing the teaching data 32a using the override ratio calculated at step S103 (step S105). When the condition at step S104 is not satisfied (No at step S104), the determination processing at step S104 is repeated.

Next, the corrector 31b determines whether the conveyance speed V has changed (step S106). When the conveyance speed V has changed (Yes at step S106), the corrector 31b corrects the reproduction speed based on the changed conveyance speed V (step S107). When the condition at step S106 is not satisfied (No at step S106), step S107 is bypassed to step at S108.

Next, the corrector 31b determines whether the operation on the workpiece W has ended (step S108). When the operation on the workpiece W has ended (Yes at step S108), the entire processing ends. When the condition at step S108 is not satisfied (No at step S108), step S106 and later steps are repeated.

As has been described hereinbefore, the robot system 1 according to this embodiment includes the conveyor 10, the robot 20, the obtainer 11, and the robot controller 30. The conveyor 10 conveys the workpiece W. The robot 20 performs an operation on the workpiece W while the workpiece W is being conveyed. The obtainer 11 obtains the conveyance speed V of the workpiece W. The robot controller 30 controls a motion of the robot 20. The robot controller 30 includes the corrector 31b. The corrector 31b corrects the motion speed of the robot 20 based on the conveyance speed V obtained by the obtainer 11.

With this configuration, even if a change occurs in the conveyance speed V of the workpiece W being conveyed, the robot system 1 according to this embodiment corrects the motion speed of the robot 20 based on the obtained conveyance speed V. Thus, even if a change occurs in the conveyance speed V, the robot system 1 maintains a high level of accuracy of the operation on the workpiece W.

The robot system 1 according to this embodiment performs the first operation of making a relative speed of the robot 20 relative to the workpiece W constant for a predetermined period of time. Some operations, such as screwing and spot welding, involve keeping working on one portion of the workpiece W at a relative speed of zero. The above configuration enables these operations to be performed with a high level of accuracy, irrespective of whether the conveyance speed V has changed. Other operations, such as arc welding and sealing, involve a constant relative speed, other than zero, relative to the workpiece W. The above configuration enables these operations to be performed with a high level of accuracy, irrespective of whether the conveyance speed V has changed.

While in this embodiment the robot system 1 obtains the conveyance speed V using the camera 11, the robot system 1 may obtain the conveyance speed V by any other method. Other possible methods will be described by referring to FIGS. 10A and 10B.

Figure 10A:
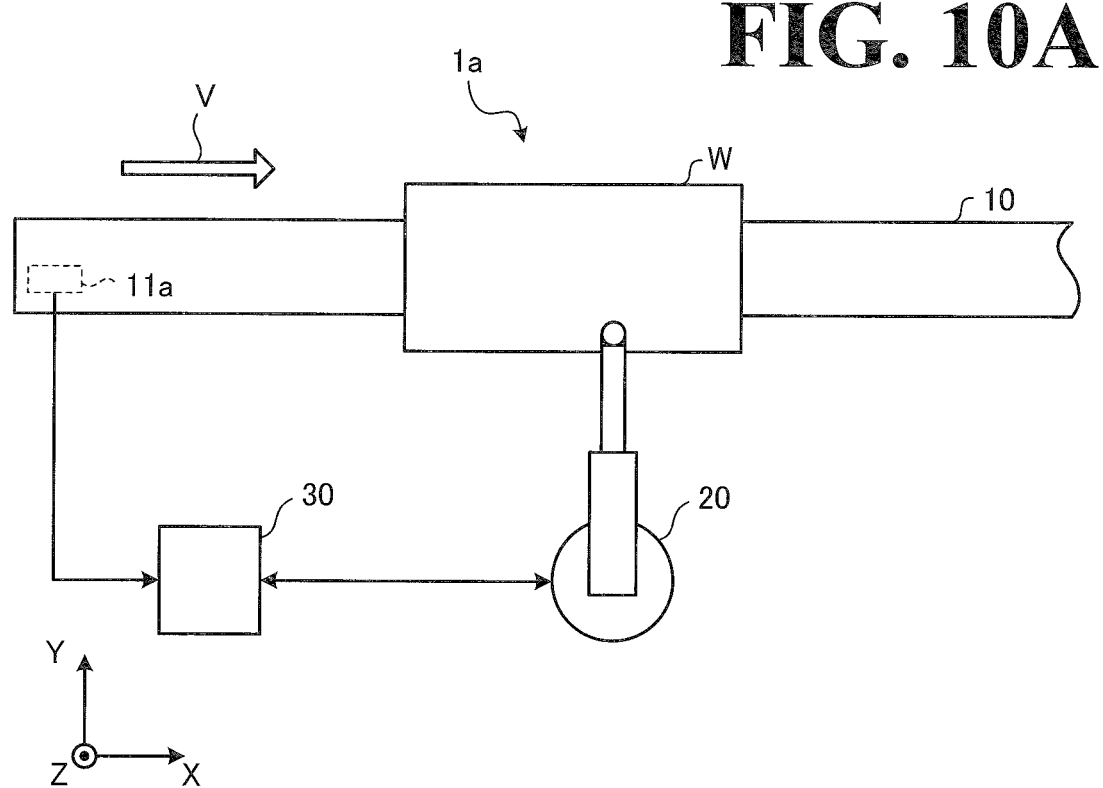
FIG. 10A is a schematic illustrating a first modification of the robot system.
Figure 10B:
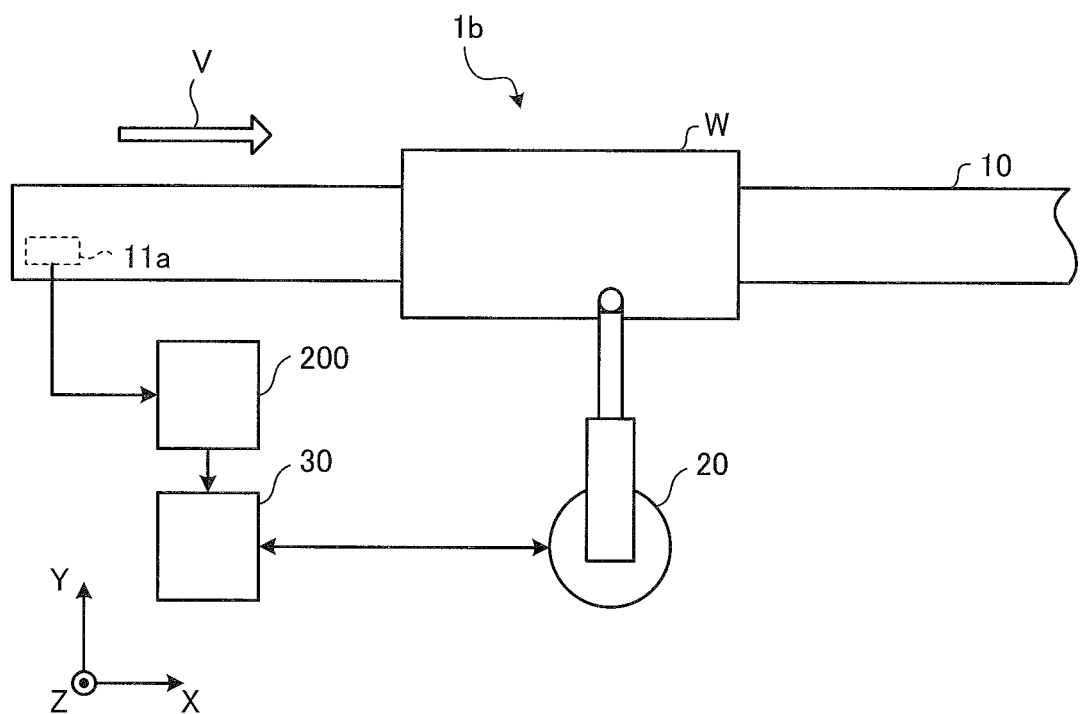
FIG. 10B is a schematic illustrating a second modification of the robot system.

FIG. 10A is a schematic illustrating a first modification of the robot system 1, and FIG. 10B is a schematic illustrating a second modification of the robot system 1. It is to be noted that identical reference numerals are used to denote identical or substantially identical components throughout FIGS. 1, 10A, and 10B, and redundant description will be omitted or minimized.

As illustrated in FIG. 10A, a robot system 1a according to the first modification is different from the robot system 1 illustrated in FIG. 1 in that the robot system 1a obtains the conveyance speed V using an encoder 11a, instead of the camera 11 (see FIG. 1). A non-limiting example of the encoder 11a is an actuator such as a motor of the conveyor 10.

The encoder 11a outputs an output value to the robot controller 30, and upon receipt of the output value, the obtainer 31a (see FIG. 2) of the robot controller 30 calculates the conveyance speed V based on the output value. Thus, use of the encoder 11a of the conveyor 10 lowers the cost of the robot system 1a. In another possible embodiment, the encoder 11a calculates the conveyance speed V.

While in FIG. 10A a single robot controller 30 and a single robot 20 are used, this configuration is not intended in a limiting sense. Another possible embodiment is that a plurality of robot controllers 30 are provided under the control of the encoder 11a, and that at least one robot 20 is provided under the control of each of the robot controllers 30.

As illustrated in FIG. 10B, a robot system 1b is different from the robot system 1a illustrated in FIG. 10A in that a robot system 1b includes a conveyance speed calculator 200 between the encoder 11a and the robot controller 30.

The conveyance speed calculator 200 calculates the conveyance speed V based on an output value received from the encoder 11a. Then, the conveyance speed calculator 200 outputs the calculated conveyance speed V to the robot controller 30. This configuration saves the robot controller 30 the load of processing.

While in FIG. 10B a single robot controller 30 and a single robot 20 are used, this configuration is not intended in a limiting sense. Another possible embodiment is that a plurality of robot controllers 30 are provided under the control of the conveyance speed calculator 200, and that at least one robot 20 is provided under the control of each of the robot controllers 30.

It will be understood by those skilled in the art that in the robot system 1 illustrated in FIG. 1, an additional device that calculates the conveyance speed V based on image data may be provided under the control of and independent of the camera 11. Also, one or a plurality of robot controllers 30 may be provided under the control of the additional device.

While in the above-described embodiment the robot 20 is a seven-axis robot, the robot 20 may be a robot having eight or more axes or may be a robot having equal to or less than six axes.

Obviously, numerous modifications and error of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system comprising:
   a conveyor configured to convey a workpiece at a conveyance speed;
   a robot configured to work on the workpiece while the workpiece is conveyed by the conveyor;
   a speed calculation circuit configured to calculate the conveyance speed;
   a robot control circuit configured to control a working speed of the robot according to the conveyance speed calculated by the speed calculation circuit; and
   a camera configured to pick up an image of the workpiece continuously while the workpiece is conveyed by the conveyor,
   wherein the robot comprises an end effector to work on the workpiece,
   wherein the end effector includes a spot welding gun,
   wherein the working speed is a speed of a movement of the end effector,
   wherein an operation performed by the robot comprises a first operation of making a relative speed of the robot relative to the workpiece constant for a period of time,
   wherein in the first operation, the robot is configured to make a leading end of the robot contact the workpiece,
   wherein the robot is configured to perform the first operation on a plurality of portions of the workpiece,
   wherein the robot is configured to work at an initial working speed,
   wherein the robot control circuit comprises a correction circuit configured to correct the initial working speed such that the initial working speed is substantially equal to the working speed,
   wherein the robot control circuit comprises a detection circuit configured to detect a position displacement of the workpiece and a posture displacement of the workpiece based on the image picked up by the camera, and
   wherein the correction circuit is configured to correct, based on the position displacement and the posture displacement detected by the detection circuit, a motion of the robot relative to the workpiece.

2. The robot system according to claim 1, further comprising:
   an additional robot configured to work on the workpiece while the workpiece is conveyed by the conveyor,
   wherein the robot and the additional robot are arranged in a conveyance direction of the conveyor.

3. The robot system according to claim 2,
   wherein the robot and the additional robot are arranged with movable ranges of the robot and the additional robot not overlapping each other in the conveyance direction, and
   wherein the robot control circuit is configured to control the working speed to make the robot and the additional robot complete an operation within the respective movable ranges.

4. The robot system according to claim 1, further comprising a memory to store teaching data of a motion that has been taught to the robot with the workpiece kept stationary, wherein the robot control circuit is configured to change, based on the conveyance speed calculated by the speed calculation circuit, a reproduction speed at which the teaching data is reproduced in order to control the working speed.

* * * * *